US012502836B2

United States Patent
Janbain et al.

(10) Patent No.: US 12,502,836 B2
(45) Date of Patent: Dec. 23, 2025

(54) AIR CURTAIN FOR PHOTOPOLYMER 3D PRINTER

(71) Applicant: Gulf Filtration Systems Inc., Burlington, MA (US)

(72) Inventors: Mohamad Janbain, Oberhausen (DE); Alexandr Shkolnik, Los Angeles, CA (US); Kirin Xu, Aliso Viejo, CA (US)

(73) Assignee: SprintRay, Inc., Los Angeles, CA (US)

( * ) Notice: Subject to any disclaimer, the term of this patent is extended or adjusted under 35 U.S.C. 154(b) by 75 days.

(21) Appl. No.: 18/540,014

(22) Filed: Dec. 14, 2023

(65) Prior Publication Data

US 2024/0293971 A1   Sep. 5, 2024

Related U.S. Application Data

(60) Provisional application No. 63/432,607, filed on Dec. 14, 2022.

(51) Int. Cl.
  *B29C 64/364*   (2017.01)
  *B29C 64/124*   (2017.01)
  (Continued)

(52) U.S. Cl.
  CPC .......... *B29C 64/364* (2017.08); *B29C 64/124* (2017.08); *B29C 64/135* (2017.08);
  (Continued)

(58) Field of Classification Search
  CPC ... B29C 64/364; B29C 64/106; B29C 64/124; B29C 64/129; B29C 64/135
  See application file for complete search history.

(56) References Cited

U.S. PATENT DOCUMENTS

| 7,008,206 B2 * | 3/2006 | Fong | B29C 64/255 425/73 |
| 12,097,659 B2 * | 9/2024 | Liao | B29C 64/295 |

(Continued)

FOREIGN PATENT DOCUMENTS

| CN | 108044940 A | 5/2018 |
| CN | 108943722 A | 12/2018 |

(Continued)

OTHER PUBLICATIONS

Truxova et al., "Ceramic 3D Printing: Comparison of SLA and DLP Technologies", MM Science Journal, Jun. 2020.

(Continued)

*Primary Examiner* — Atul P. Khare
(74) *Attorney, Agent, or Firm* — Jafari Law Group, Inc.

(57) ABSTRACT

Apparatuses and methods for making at three-dimensional object from a solidifiable material are shown and described. A pattern generator comprising at least one lens transmits light to a photopolymer that solidifies by curing, cross-section by cross-section, in the shape of received patterns of light. The photopolymer curing reactions are exothermic and generate heat within the solidifiable material, causing portions of it to vaporize. A crossflow blower, sometimes referred to as an "air curtain" or "tangential blower", blows air across the lenses to isolate the lenses from the photopolymer vapors, which prevents the vapors from condensing or otherwise depositing on the lenses. Prevention of such condensation or deposition reduces the likelihood of image distortion and/or reductions in projected light intensity.

20 Claims, 6 Drawing Sheets

(51) Int. Cl.
  *B29C 64/135* (2017.01)
  *B29C 64/153* (2017.01)
  *B29C 64/20* (2017.01)
  *B33Y 10/00* (2015.01)
  *B33Y 30/00* (2015.01)
  *B33Y 80/00* (2015.01)

(52) U.S. Cl.
  CPC ............ *B29C 64/153* (2017.08); *B29C 64/20* (2017.08); *B33Y 10/00* (2014.12); *B33Y 30/00* (2014.12)

(56) References Cited

U.S. PATENT DOCUMENTS

2019/0299527 A1* 10/2019 Kitamura .............. B29C 64/268
2020/0316864 A1* 10/2020 Satou ..................... B33Y 30/00
2022/0032545 A1*  2/2022 Fey ........................ B29C 64/35

FOREIGN PATENT DOCUMENTS

| CN | 112643057 A | * | 4/2021 | ............ B33Y 30/00 |
| GB | 2550339 A | * | 11/2017 | ............ B33Y 30/00 |
| WO | WO-2023240926 A1 | * | 12/2023 | ............ B33Y 30/00 |

OTHER PUBLICATIONS

English translation of CN108044940A from Total Patent One.
English translation of CN108943722A from Total Patent One.

* cited by examiner

AIR CURTAIN FOR PHOTOPOLYMER 3D PRINTER

CROSS-REFERENCE TO RELATED APPLICATIONS

This application claims the benefit of U.S. Provisional Patent Application No. 63/432,607, filed Dec. 14, 2022, the entirety of which is hereby incorporated by reference.

FIELD

This disclosure relates to apparatuses and methods for making three-dimensional objects from a solidifiable material, and more specifically to methods that provide a "curtain" of air to reduce the extent or likelihood of resin-containing air condensing or depositing on the lens of a digital light projector.

BACKGROUND

Three-dimensional rapid prototyping and manufacturing allows for quick and accurate production of components at high accuracy. Machining steps may be reduced or eliminated using such techniques and certain components may be functionally equivalent to their regular production counterparts depending on the materials used for production.

The components produced may range in size from small to large parts. The manufacture of parts may be based on various technologies including photopolymer hardening using light or laser curing methods. Secondary curing may take place with exposure to, for example, ultraviolet (UV) light. A process to convert a computer aided design (CAD) data to a data model suitable for rapid manufacturing may be used to produce data suitable for constructing the component. Then, a pattern generator may be used to construct the part. An example of a pattern generator may include the use of DLP (Digital Light Processing technology) from Texas Instruments®, SXRD™ (Silicon X-tal Reflective Display), LCD (Liquid Crystal Display), LCOS (Liquid Crystal on Silicon), DMD (digital mirror device), J-ILA from JVC, SLM (Spatial light modulator) or any type of selective light modulation system. Examples of such DLP based systems are provided U.S. Pat. Nos. 8,372,330 and 8,666,142, the entirety of each of which is hereby incorporated by reference The pattern generator will also typically include lenses to adjust the size and focus of light projected to the photopolymer. The polymerization and/or cross-linking reactions that solidify the photopolymer are exothermic and heat the volume of resin in the area of solidification. The generated heat increases the vapor pressure of the unsolidified photopolymer resin, which can cause it to vaporize into the volume of air above the resin container and then condense on or otherwise deposit on the pattern generator lens, which can reduce the amount of light transmitted to the photopolymer and/or distort the light pattern, both of which can result in inaccurate object builds.

Thus, a need has arisen for a system and method of making three-dimensional objects which addresses the foregoing issues.

SUMMARY

In accordance with a first aspect of the present disclosure, an apparatus for making a three-dimensional object from a solidifiable material is provided which comprises a source of solidification energy, a source of solidifiable material, a build platform movable relative to the source of solidifiable material, and a blower positioned to blow air between the source of solidification energy and the source of solidifiable material. In certain examples, the source of solidification energy is a pattern generator such as a digital light projector with lenses that extend into a printing chamber of the apparatus. In the same or other examples, the blower is a crossflow blower with an outlet opening oriented perpendicularly to the plane defined by the build platform.

In accordance with a second aspect of the present disclosure, A method of making a three-dimensional object from a solidifiable material is provided. The method comprises supplying solidification energy from a source of solidification energy to a solidifiable material in a pattern corresponding to the three-dimensional object, wherein the source of solidification energy and the source of solidifiable material are spaced apart along a height axis, and the step of supplying solidification energy from the source of solidification energy to the solidifiable material generates solidifiable material vapors from the solidifiable material. The method comprises blowing air in a direction perpendicular to the height axis, thereby entraining solidifiable material vapors in the blown air.

DETAILED DESCRIPTION

The systems disclosed herein are generally used for manufacturing three-dimensional objects from a solidifiable material and rapid prototyping. A pattern generator (such as a digital light projector, laser, etc.) provides an image to the solidifiable material to selectively solidify it.

As discussed herein, a solidifiable material is a material that when subjected to energy, wholly or partially hardens. This reaction to solidification or partial solidification may be used as the basis for constructing the three-dimensional object. Examples of a solidifiable material may include a polymerizable or cross-linkable material, a photopolymer, a photo powder, a photo paste, or a photosensitive composite that contains any kind of ceramic based powder such as aluminum oxide or zirconium oxide or ytteria stabilized zirconium oxide, a curable silicone composition, silica based nano-particles or nano-composites. The solidifiable material may further include fillers. Moreover, the solidifiable material may take on a final form (e.g., after exposure to the electromagnetic radiation) that may vary from semi-solids, solids, waxes, and crystalline solids. In preferred examples herein, the solidifiable material is a photopolymer that hardens in response to light through an exothermic curing reaction which causes a portion of the solidifiable material to vaporize. As discussed further below, in preferred systems a cross-flow blower is provided to isolate the lenses of a pattern generator from solidifiable material that vaporizes due to the heat generated from the curing (crosslinking) reactions.

When discussing a photopolymerizable, photocurable, or solidifiable material, any material is meant, possibly comprising a resin and optionally further components, which is solidifiable by means of supply of stimulating energy such as electromagnetic radiation. Suitably, a material that is polymerizable and/or cross-linkable (i.e., curable) by electromagnetic radiation (common wavelengths in use today include UV radiation and/or visible light) can be used as such material. In an example, a material comprising a resin formed from at least one ethylenically unsaturated compound (including but not limited to (meth)acrylate monomers and polymers) and/or at least one epoxy group-containing compound may be used. Suitable other components of the solidifiable material include, for example, inorganic and/or organic fillers, coloring substances, viscose-controlling agents, etc., but are not limited thereto.

When photopolymers are used as the solidifiable material, a photoinitiator is typically provided. The photoinitiator absorbs light and generates free radicals which start the polymerization and/or crosslinking process. Suitable types of photoinitiators include metallocenes, 1,2 di-ketones, acylphosphine oxides, benzyldimethyl-ketals, α-amino ketones, and α-hydroxy ketones. Examples of suitable metallocenes include Bis (eta 5-2, 4-cyclopenadien-1-yl) Bis [2,6-difluoro-3-(1H-pyrrol-1-yl) phenyl] titanium, such as Irgacure 784, which is supplied by Ciba Specialty chemicals. Examples of suitable 1,2 di-ketones include quinones such as camphorquinone. Examples of suitable acylphosphine oxides include bis acyl phosphine oxide (BAPO), which is supplied under the name Irgacure 819, and mono acyl phosphine oxide (MAPO) which is supplied under the name Darocur® TPO. Both Irgacure 819 and Darocur® TPO are supplied by Ciba Specialty Chemicals. Examples of suitable benzyldimethyl ketals include alpha, alpha-dimethoxy-alpha-phenylacetophenone, which is supplied under the name Irgacure 651. Suitable α-amino ketones include 2-benzyl-2-(dimethylamino)-1-[4-(4-morpholinyl) phenyl]-1-butanone, which is supplied under the name Irgacure 369. Suitable α-hydroxy ketones include 1-hydroxy-cyclohexyl-phenyl-ketone, which is supplied under the name Irgacure 184 and a 50-50 (by weight) mixture of 1-hydroxy-cyclohexyl-phenyl-ketone and benzophenone, which is supplied under the name Irgacure 500.

The pattern generator(s) may be configured in a number of ways. Many may provide controlled electromagnetic radiation to provide a desired pattern. The electromagnetic radiation may include actinic light, visible or invisible light, UV-radiation, IR-radiation, electron beam radiation, X-ray radiation, laser radiation, or the like. Moreover, while each type of electromagnetic radiation in the electromagnetic spectrum may be discussed generally, the disclosure is not limited to the specific examples provided. Those of skill in the art are aware that variations on the type of electromagnetic radiation and the methods of generating the electromagnetic radiation may be determined based on the needs of the application.

Referring to FIGS. 1-6, an example of a system 20 for making a three-dimensional object from a solidifiable material is described. System 20 is generally configured to receive data describing the shape and appearance of the object (such as CAD data) and to create a solid object from a solidifiable material in conformity with the data. System 20 includes a solidifiable material (not shown), which in the example of FIG. 1A is a photopolymeric resin capable of being selectively hardened by the application of electromagnetic radiation. Container 26 is a generally rigid vessel with an empty interior that holds solidifiable material. A build platform 23 is a generally rigid platform having a length along the y-axis and a width along the x-axis on which a three-dimensional object is progressively built along a height (z) axis.

System 20 includes a housing 21 for supporting and enclosing the components of system 20. Housing 21 includes a viewing window 22 that is moveably disposed in a housing opening to selectively enclose a printing chamber 33. Viewing window 22 allows users to observe an object as it is being built within printing chamber 33 during an object build operation. Viewing window 22 is mounted on a hinge 40 (FIG. 8), allowing the window 22 to be pivotally opened and closed about the longitudinal axis of hinge 40, thereby providing access to the printing chamber 33 and the built object once the build operation is complete.

Housing 21 also includes a lower compartment 30 for housing a photopolymer resin container 26. Photopolymer resin container 26 is mounted on a sliding support assembly 28 that allows container 26 to be slidably inserted and removed from lower compartment 30. The sliding support assembly 28 provides a means for adding or removing photopolymer resin from container 26 or for replacing container 26.

Figure 4:
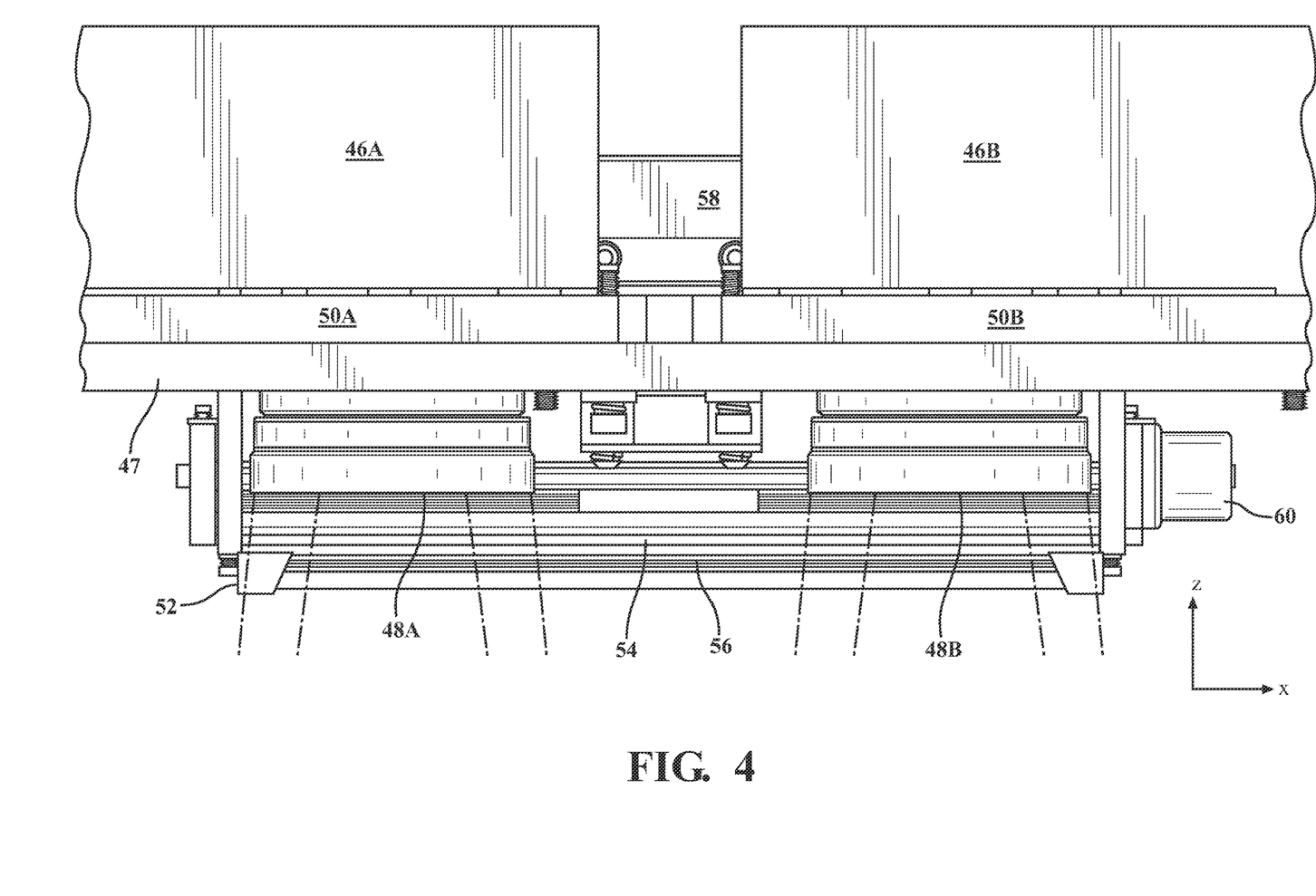
FIG. 4 is a cross-sectional view of a portion of the apparatus of FIG. 1 viewed from a first direction along the y-axis.
Figure 5:
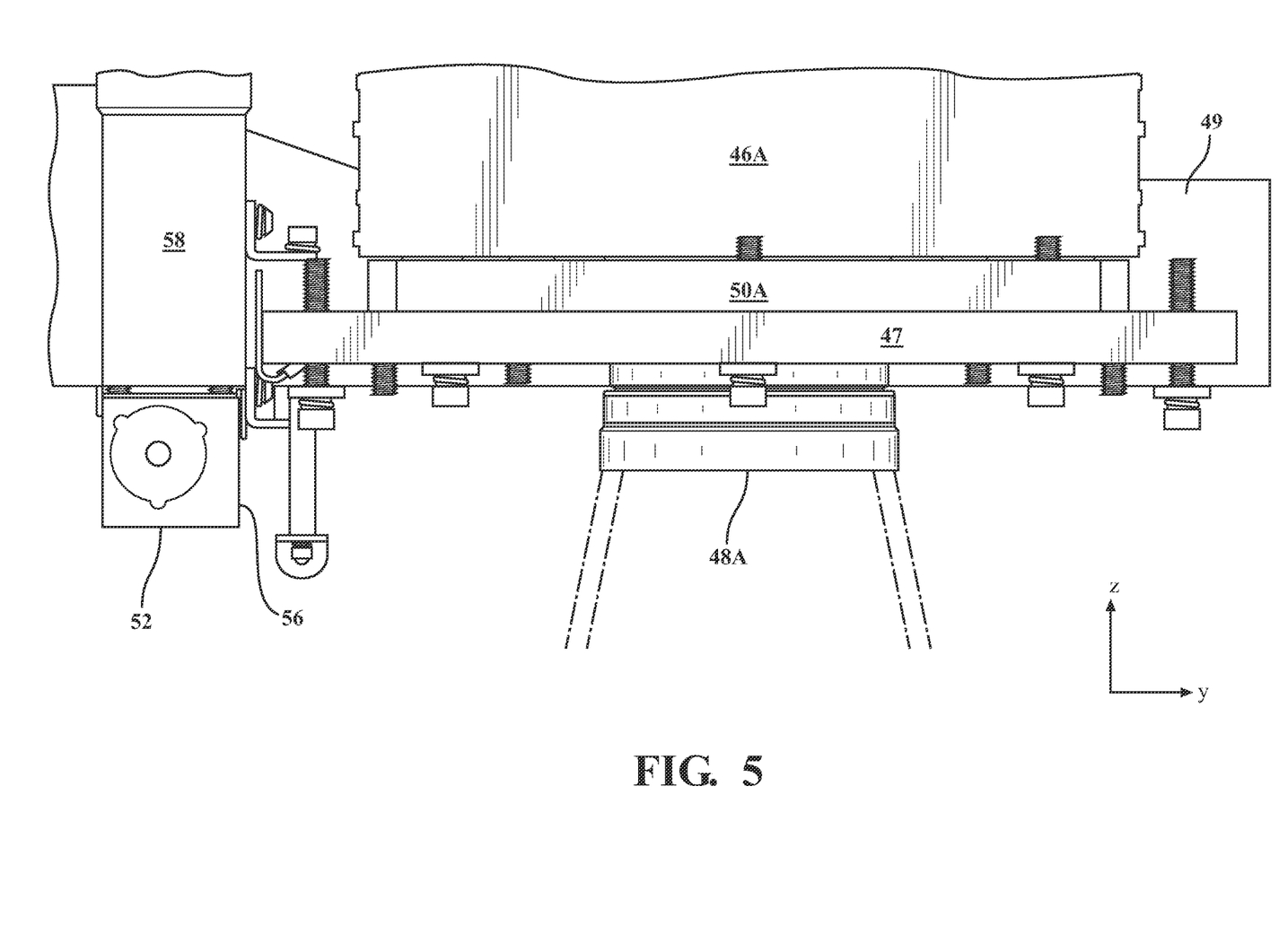
FIG. 5 is a cross-sectional view of a portion of the apparatus of FIG. 1 viewed along the x-axis.
Figure 6:
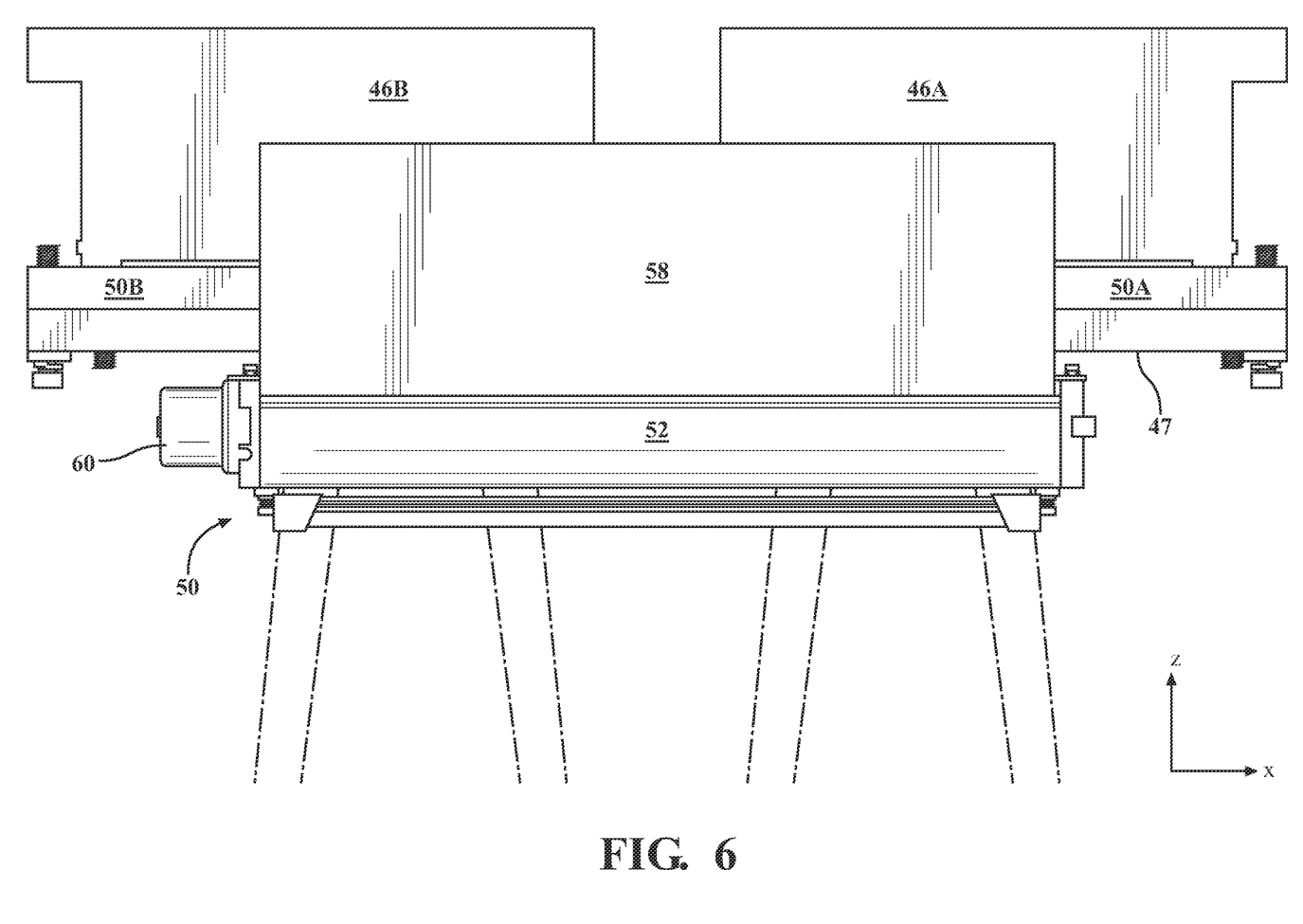
FIG. 6 is a cross-sectional view of a portion of the apparatus of FIG. 1 viewed from a second direction along the y-axis.

In addition, housing 21 includes an upper compartment (not shown) which is accessed via upper door 45. The upper compartment houses pattern generators 46A and 46B (FIG. 2-6) and their respective pattern generator calibration platforms 50A and 50B which are used to adjust the orientation of the projectors 46A and 46B relative to the x-y plane. The calibration platforms 50A and 50B are in turn connected to a support plate 47 which rests on the inward (along the x-axis) facing lips of two members (only one of which (member 49) is shown in FIG. 5, and neither of which are shown in FIG. 4 or 6) comprising a part of housing 21 (FIG. 4). Pattern generator calibration platforms 50A and 50B are positioned adjacent one another along the x-axis and include respective openings 51A and 51B through which corresponding pattern generator lenses 48A and 48B extend into printing chamber 33. Lenses 48A and 48B are located adjacent one another along the x-axis with their radial centers located a substantially the same location along the y-axis. Lenses 48A and 48B face build platform 23 and solidifiable material container 26. Different projector lens/configurations may also be used, and a dual projector/lens configuration is merely exemplary.

A work table assembly comprises a work table 36 and a solidification substrate assembly 42. Work table 36 is disposed in the printing chamber 33 between the upper compartment 44 and the lower compartment 30 and includes an opening 31 through which object build platform 23 is movably disposed. Opening 31 is preferably at least partially aligned with pattern generator support platform openings 51A and 51B so that energy supplied by pattern generators 46A and 46B is incident on the top surface of the resin in container 26.

Figure 1:
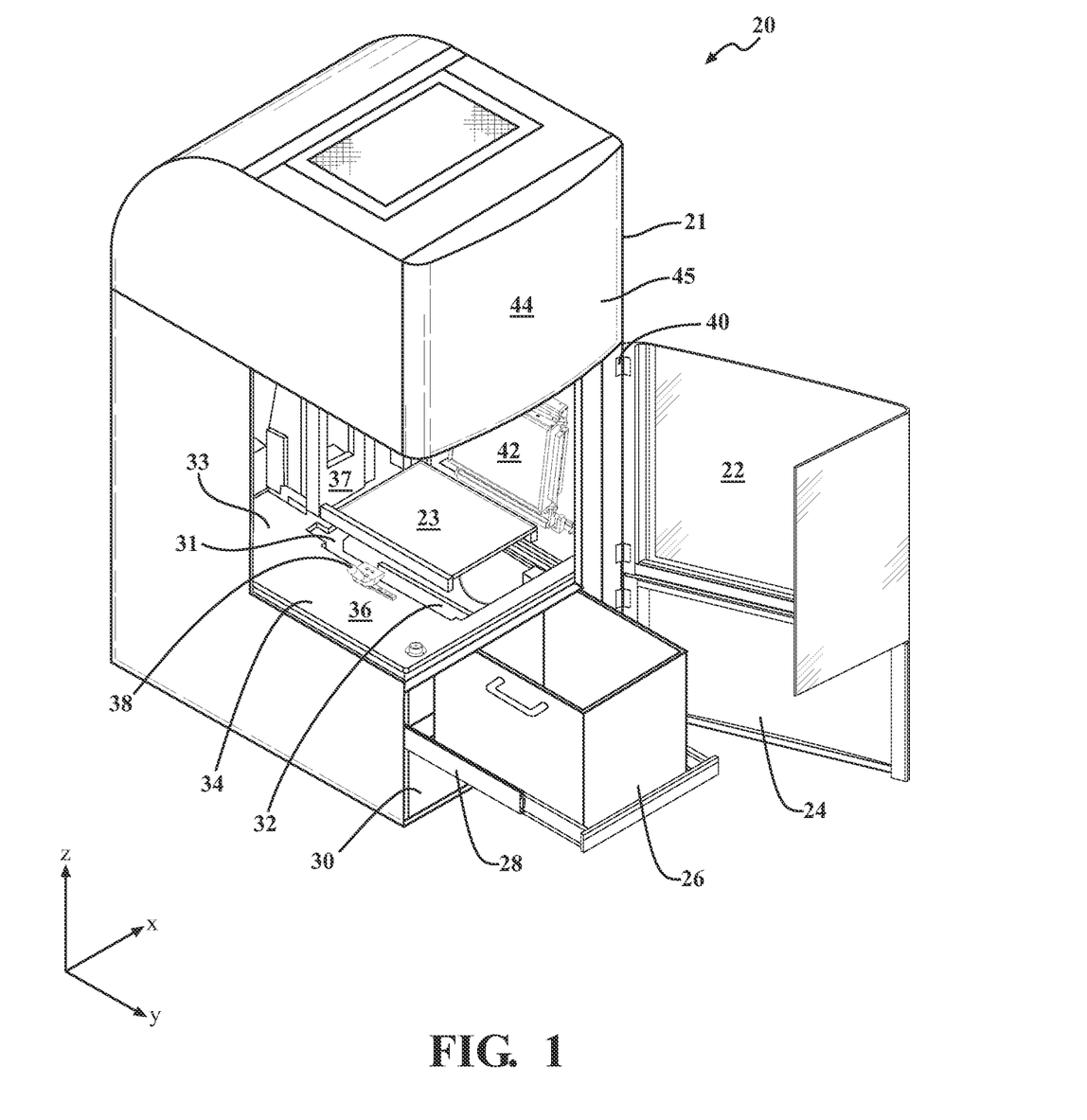
FIG. 1 is a perspective view of an apparatus for making a three-dimensional object from a solidifiable material, shown with the printing chamber viewing window open and the resin container partially removed from the apparatus housing.

Build platform 23 is connected to elevator assembly 37 which moves build platform 23 downward into resin container 26 during an object build operation and upward out of resin container 26 after an object build operation is complete. As indicated in FIG. 1, build platform 23 has a rest position in which it is elevated above work table 36 to facilitate the removal of finished objects as well as the removal of any excess resin on platform 23.

The size, shape, or any other feature of the three-dimensional object built by system 20 is a function of the energy pattern provided by a pattern generators 46A and 46B. As mentioned previously, pattern generator lenses 48A and 48B extend into the printing chamber 33 and are therefore in optical communication with resin located on the build platform, or in the case of a partially completed object, with the layer of fresh resin located on the exposed object surface. The exothermic curing reactions that solidify the solidifiable material tend to cause portions of the solidifiable material to condense or otherwise deposit on lenses 48A and 48B. Crossflow blower 52 (sometimes referred to as a "tangential blower" or "tangential fan") is provided (FIG. 2) and blows air over lenses 48A and 48B in a direction along the y-axis (FIG. 5), providing an "air curtain" that seals or isolates the lenses 48A and 48B from vaporized solidifiable material. The cross-flow blown air expels the vapors from printing chamber 33. In certain examples, the air with entrained solidifiable material vapor exits the printing chamber 33 through spaces between the viewing window 44 and the portions of housing 21 that surround it. In other examples, one or more vents may be provided for the discharge of cross-blown air and solidifiable material vapors. Such vents may simply be open to the atmosphere, or they may be coupled to a fume extraction unit comprising a fume discharge conduit that routes them to a suitable discharge location.

Figure 2:
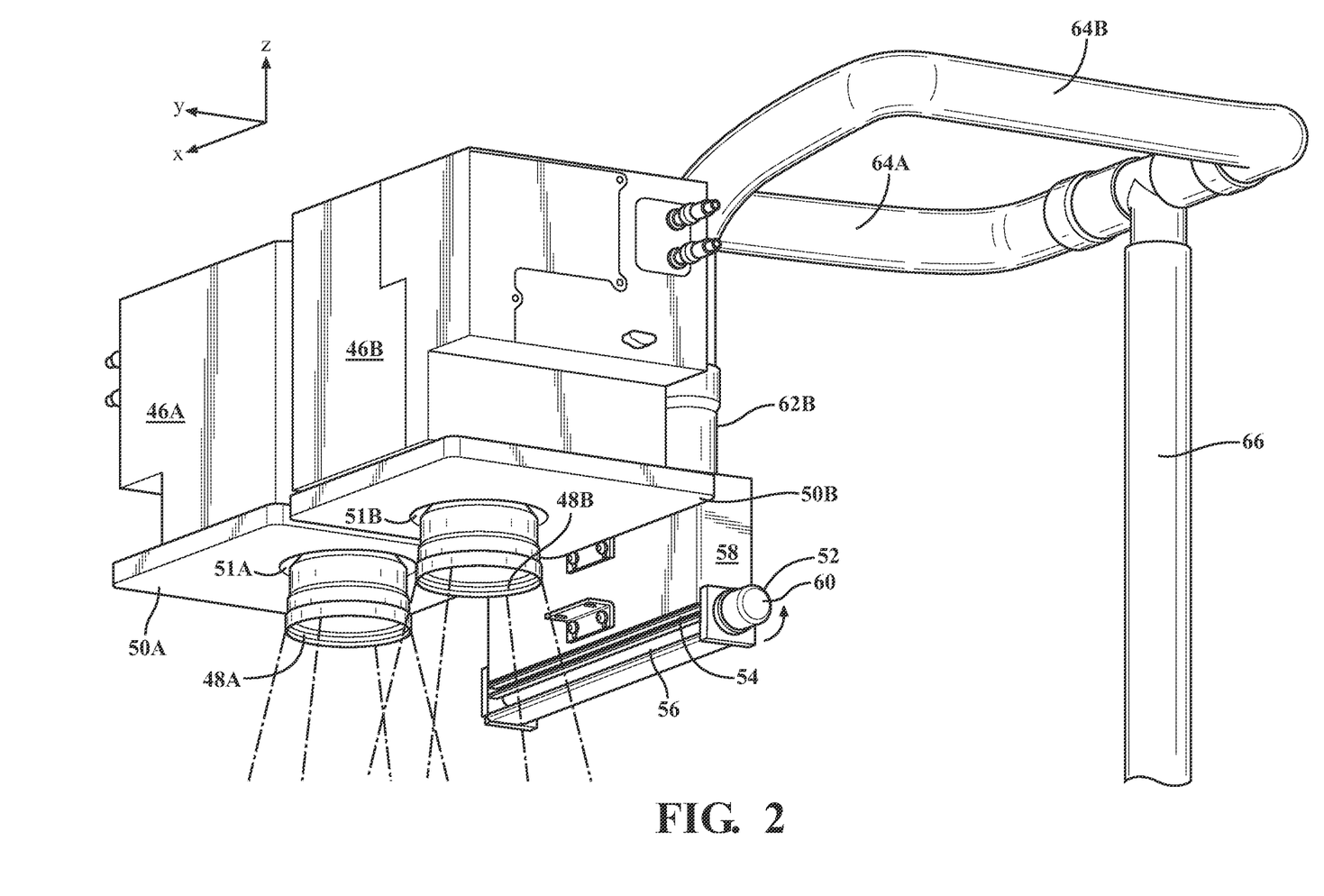
FIG. 2 is a perspective view of a portion of the apparatus of FIG. 1 with a crossflow air blower connected to an air filtration unit.

As indicated in FIGS. 2, 4, and 6 crossflow blower 52 has a length along the x-axis and an impeller that rotates about an axis of rotation parallel to the x-axis (see curved arrow in FIG. 2). Motor 60 rotates an impeller 54 to draw in and expel air from the crossflow blower outlet 56. Impeller 54 comprises a series of blades having lengths along the x-axis which collectively define a generally cylindrical shape with a hollow central interior. As the impeller blades rotate, they draw air into the hollow central interior and then force it out from discharge opening 56. Discharge opening 56 defines a generally planar open area for discharging air which has a length along the x-axis and height along the height (z) axis. The generally planar open area is parallel to the height (z) axis and perpendicular to the plane defined by build platform 23, i.e., the x-y plane.

An inlet housing 58 partially encloses about half the circumference (when viewed along the x-axis) of the impeller blades 54 and acts as an inlet manifold to distribute inlet air more evenly along the length (x-axis) of the crossflow blower 52. The flow rate of air discharged by crossflow blower 52 is preferably sufficient to isolate lenses 48A and 48B from vapors generated by the solidification of the solidifiable material in container 26 without being so high as to generate an appreciable positive pressure within printing chamber 33 or disturb the printing process. In certain examples, the flow rate of air from crossflow blower 52 is from about 60 cubic feet per meter to about 120 cubic feet per meter, preferably from about 75 cubic feet per meter to about 105 cubic feet per meter, and more preferably from about 85 to about 95 cubic feet per meter. In one exemplary implementation, crossflow blower 52 is a McMaster 2087K16 crossflow blower having a flow rate of 91 cubic feet per meter and a rectangular outlet opening that is about 352 mm wide (x-axis) and about 16 mm high (z-axis).

Figure 3:
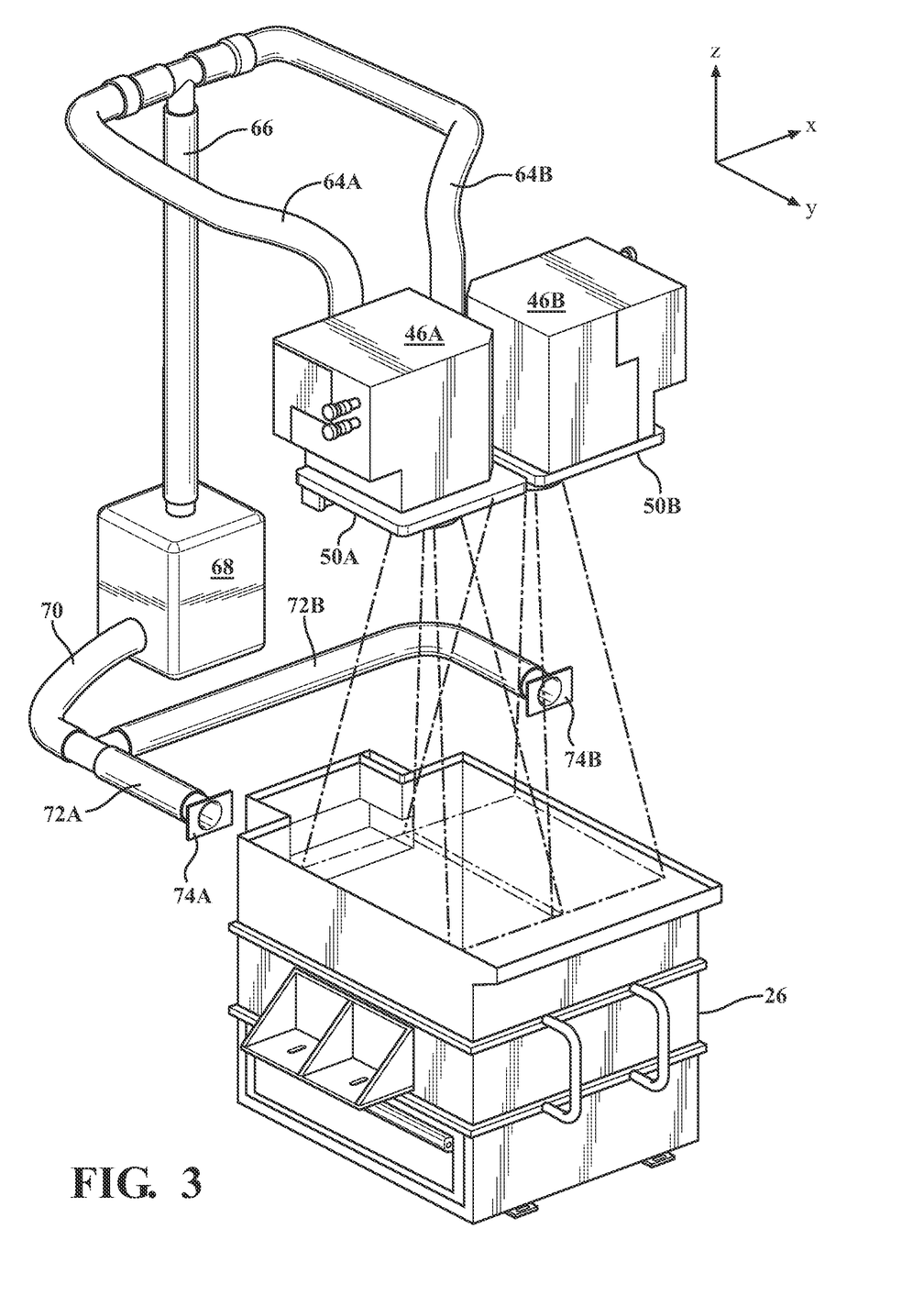
FIG. 3 is a perspective view of a portion of the apparatus of FIG. 1 and an air filtration unit in which the crossflow blower is not visible and ambient air inlet lines to the air filter are shown.

Referring to FIGS. 2-3, in certain examples, crossflow blower 52 receives and blows filtered air to reduce the likelihood of blowing dirty air or possibly even recirculated air with entrained solidifiable material vapors across lenses 48A and 48B. Filter 68 is provided to and receives air from an inlet manifold 70 that is connected to dual air intake lines 72A and 72B, each of which is connected to a respective air inlet opening 74A and 74B. Filter 68 is designed to remove particulates from air received in inlet manifold 70 and may be, for example, a HEPA filter, a carbon filter, an activated carbon filter, or another type of filter depending on environmental concerns. Filter 68 discharges air to a discharge line 66 which is fluidly coupled to blower intake lines 64A and 64B. Blower intake lines 64A and 64B are coupled to respective inlet ports (not visible) on the top of blower inlet housing 58 via inlet couplings 62A (not shown) and 62B (shown in FIG. 2). The rotation of the impeller 54 creates a slight negative pressure within blower inlet housing 58 to draw air in from inlet ports 74A and 74B and through filter 68.

A method of forming a three-dimensional object using apparatus 20 will now be described. In accordance with the method, a computer operatively connected to pattern generators 46A and 46B transmits image data that defines a patterns of light to be transmitted from pattern generators 46A and 46B for each of a plurality of object cross-sections. In the case of a digital light projector, the light pattern is created by the movement of mirrors in a mirror array within the projector. In the case of an LCD projector, the light pattern is dictated by the transparency or opaqueness of each of the LCD elements.

Each layer of the three-dimensional object is built by projecting images (which may be UV light images) defining the object onto an exposed thickness of resin that is coated over the last formed object layer. In the case of a photopolymer, the light initiates curing (crosslinking) reactions which solidify the photopolymer and generate heat. The heat generation in turn vaporizes a portion of the photopolymer, and the vapors tend to rise within the printing chamber 33. Crossflow blower 52 blows air across-the x-y plane in a direction along the y-axis from the build platform elevator 37 toward viewing window 22, entraining the vapors and ultimately exiting the print chamber 33 through a vent or through openings such as the opening between window 22 and a surrounding portion of housing 21. In certain examples, the cross-flow blown air has a flow rate ranging from about 60 cubic feet per minute to about 120 cubic feet per minute, preferably from about 75 cubic feet per minute to about 104 cubic feet per minute, and more preferably from about 90 cubic feet per minute to about 85 cubic feet per minute to about 95 cubic feet per minute. In preferred examples, the cross-flow blown air seals the lenses 48A and 48B from the vaporized photopolymer and keeps the lenses 48A and 48B free of condensed or otherwise deposited photopolymer.

What is claimed is:

1. An apparatus for making a three-dimensional object from a solidifiable material, comprising:
   a source of solidification energy;
   a source of solidifiable material;
   a build platform movable relative to the source of solidifiable material; and
   a crossflow blower attached to a support plate for the source of solidification energy and configured to blow air between the source of solidification energy and the source of solidifiable material for entraining vapors of the solidifiable material in the blown air.

2. The apparatus of claim 1, wherein the solidifiable material is a photopolymer and the source of solidification energy comprises a light projector configured to project light onto the photopolymer.

3. The apparatus of claim 2, wherein the light projector comprises at least one lens, and the blower is operable to blow the air across a surface of the at least one lens facing the source of solidifiable material.

4. The apparatus of claim 3, wherein the blower is operable to isolate the at least one lens from the solidifiable material vapors, the solidifiable material vapors generated by supplying solidification energy from the source of solidification energy to the solidifiable material.

5. The apparatus of claim 4, wherein the crossflow blower has an air outlet defining an air outlet plane, wherein the at least one lens is spaced apart from the source of solidifiable material along a height axis, and wherein the air outlet plane is parallel to the height axis.

6. The apparatus of claim 2, wherein the light projector comprises two lenses, and the blower is operable to blow the air across a surface of the two lenses facing the source of solidifiable material.

7. The apparatus of claim 1, wherein the build platform has a length and a width defining a build area, and the blower is a crossflow blower having an air outlet defining an air outlet plane that is perpendicular to the build area.

8. The apparatus of claim 7, wherein the crossflow blower has an impeller that rotates about an axis that is parallel to the build area.

9. The apparatus of claim 7, wherein the crossflow blower has a rotating impeller connected to a housing that defines an air inlet manifold, and the air inlet manifold is in fluid communication with the air outlet.

10. The apparatus of claim 1, wherein during an object build operation, a portion of the solidifiable material vaporizes in response to receiving solidification energy from the source of solidification energy.

11. The apparatus of claim 1, wherein the source of solidification energy comprises a digital light projector.

12. The apparatus of claim 1, wherein the source of solidification energy comprises a spatial light modulator.

13. The apparatus of claim 1, wherein the blower is operable to blow the air at a volumetric flow rate ranging from about 60 to about 120 cubic feet per minute.

14. The apparatus of claim 1, wherein the blower has an air inlet that is in fluid communication with an air filter.

15. The apparatus of claim 14, further comprising a housing that includes a printing chamber and a door, wherein the door is operable to selectively enclose the printing chamber, and the air filter has at least one air inlet port located outside of the housing.

16. A method of making a three-dimensional object from a solidifiable material, comprising:
   supplying solidification energy from a source of solidification energy to a solidifiable material in a pattern corresponding to the three-dimensional object, wherein the source of solidification energy and the solidifiable material are spaced apart along a height axis, and wherein the step of supplying solidification energy from the source of solidification energy to the solidifiable material generates solidifiable material vapors from the solidifiable material; and
   blowing air in a direction perpendicular to the height axis by a crossflow blower attached to a support plate for the source of solidification energy, thereby entraining the solidifiable material vapors in the blown air.

17. The method of claim 16, wherein the source of solidification energy comprises at least one lens, and the step of blowing air perpendicular to the height axis isolates the at least one lens from the generated solidifiable material vapors.

18. The method of claim 16, wherein the step of supplying solidification energy from the source of solidification energy to the source of solidifiable material comprises supplying the solidification energy to the source of solidifiable material within a printing chamber in a housing, and the step of blowing air in a direction perpendicular to the height axis expels the solidifiable material vapors from the printing chamber.

19. The method of 16, further comprising a step of filtering ambient air, wherein the step of blowing air in the direction perpendicular to the height axis comprises blowing the filtered ambient air in the direction perpendicular to the height axis.

20. The method of claim 16, wherein the step of blowing air in the direction perpendicular to the height axis comprises blowing the air at a rate of from about 60 to about 120 cubic feet per minute.

* * * * *